United States Patent
Seitz et al.

(10) Patent No.: US 12,427,946 B2
(45) Date of Patent: Sep. 30, 2025

(54) AIRBAG MODULE

(71) Applicant: ZF AUTOMOTIVE GERMANY GMBH, Alfdorf (DE)

(72) Inventors: Martin Seitz, Schwabisch Gmünd (DE); Rolan Goller, Murrhardt (DE); Kathrin Weinhardt, Mutlangen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/711,125

(22) PCT Filed: Nov. 16, 2022

(86) PCT No.: PCT/EP2022/082102
§ 371 (c)(1),
(2) Date: May 17, 2024

(87) PCT Pub. No.: WO2023/088947
PCT Pub. Date: May 25, 2023

(65) Prior Publication Data
US 2025/0033591 A1    Jan. 30, 2025

(30) Foreign Application Priority Data
Nov. 17, 2021   (DE) ..................... 10 2021 130 026.6

(51) Int. Cl.
*B60R 21/217*   (2011.01)
*B60R 21/207*   (2006.01)
*B60R 21/235*   (2006.01)

(52) U.S. Cl.
CPC ........ *B60R 21/2171* (2013.01); *B60R 21/207* (2013.01); *B60R 21/235* (2013.01); *B60R 2021/23509* (2013.01)

(58) Field of Classification Search
CPC .......................... B60R 21/2171; B60R 21/207
See application file for complete search history.

(56) References Cited

U.S. PATENT DOCUMENTS

| | | | | |
|---|---|---|---|---|
| 7,396,042 B2* | 7/2008 | Mabuchi | ............. | B60R 21/2171 280/730.2 |
| 7,614,649 B2* | 11/2009 | Kashiwagi | .......... | B60R 21/2338 280/743.1 |
| 8,356,835 B2* | 1/2013 | Yamamoto | .......... | B60R 21/2346 280/730.2 |

(Continued)

FOREIGN PATENT DOCUMENTS

DE   202004000170 U1   4/2004
DE   102005028580 A1   12/2006
(Continued)

OTHER PUBLICATIONS

International Search Report for corresponding International Application No. PCT/EP2022/082102, mailed Mar. 4, 2023, pp. 1-5.

*Primary Examiner* — Faye M Fleming
(74) *Attorney, Agent, or Firm* — Tarolli, Sundheim, Covell &Tummino LLP

(57) ABSTRACT

An airbag module includes an airbag (12) and an elongated inflator (14) protruding, with the exception of an igniter section (44), into a holding area (27) in an interior of the airbag (12). The inflator (14) extends through a first opening (28) in an outer wall (16) of the airbag (12) which forms the only insertion opening for the inflator (14).

12 Claims, 8 Drawing Sheets

(56) References Cited

U.S. PATENT DOCUMENTS

| | | | |
|---|---|---|---|
| 8,628,111 B2 * | 1/2014 | Sugimoto | B60R 21/237 |
| | | | 280/739 |
| 9,937,890 B2 * | 4/2018 | Wipasuramonton | ......................... |
| | | | B60R 21/233 |
| 10,486,633 B2 * | 11/2019 | Kino | B60R 21/268 |
| 10,507,782 B2 * | 12/2019 | Nagata | B60R 21/2171 |
| 11,554,745 B2 * | 1/2023 | Zischka | B60R 21/23138 |
| 2011/0316263 A1 | 12/2011 | Lunt | |
| 2012/0018986 A1 | 1/2012 | Feller | |

FOREIGN PATENT DOCUMENTS

| | | |
|---|---|---|
| DE | 202008005545 U1 | 8/2008 |
| DE | 102013000049 A1 | 7/2014 |

* cited by examiner

AIRBAG MODULE

RELATED APPLICATIONS

This application is a U.S. National Stage Application filed under 35 USC 371, claiming priority to Serial No. PCT/EP2022/082102, filed on 16 Nov. 2022; which claims priority from Patent Application 10 2021 130 026.6, filed 17 Nov. 2021, the entireties of which are hereby incorporated herein by reference.

The invention relates to an airbag module comprising an elongated inflator.

At one end, inflators of such type usually include an igniter which is electrically contacted to activate the inflator. At the other end, there is frequently disposed an outflow area including outflow openings through which the generated gas flows into an airbag.

When installed, the outflow area is located in the interior of the airbag, while the end containing the igniter with the electrical connection cables arranged thereon protrudes from the airbag.

In particular in airbag modules which are installed into the backrest of a vehicle seat, mounting slits which are offset against each other and through which the inflator is initially introduced completely into the interior of the airbag have been arranged in an outer wall of the airbag so far. Subsequently, the igniter section is slid outwards again through a further opening.

It is the object of the invention to suggest an improvement for installing an inflator in an airbag.

This object is achieved by an airbag module which comprises an airbag and an elongated inflator protruding, with the exception of an igniter section, into a holding area in an interior of the airbag, wherein the inflator extends through a first opening in an outer wall of the airbag forming the only insertion opening for the inflator.

Hence, according to the invention, there is a change from the known concept to introduce the inflator at first completely into the interior of the airbag and then to slide the igniter section outwards again. Instead, the inflator is slid with an outflow end opposite to the igniter section ahead through the opening into the interior of the airbag to such an extent that only the igniter section protrudes from the airbag. This offers the advantage that the gas tightness of the holding area of the airbag is increased, as the mounting slits are omitted.

This type of assembly is also suited for inflators which include at least one laterally projecting mounting bolt, wherein in that case the first opening has to be selected so that the inflator including the mounting bolt can be inserted through the first opening into the interior of the airbag.

In a possible variant, the cross-section of the first opening is large enough to allow the mounting bolts to be passed though the openings.

In order to improve the sealing, according to another variant, the outer wall in the area of the first opening may comprise plural superimposed fabric layers, wherein starting from the first opening two slits are arranged, a first one of the slits, starting from the outermost fabric layer of the airbag, passing through at least one, but not all fabric layers, and a second one of the slits passing the remaining fabric layers, but not the fabric layers severed by the first slit. The inflator must be rotated somewhat about its longitudinal axis so that the respective mounting bolt can pass through both slits. In this way, a type of bayonet lock or labyrinth seal is formed, with the slits arranged in different radial fabric layers impeding outflow of gas from the airbag. The actual first opening is preferably restricted to the cross-section of the inflator without the mounting bolts. Relating to the first opening, the two slits can extend radially outwardly, e.g. from opposite positions of the circumference.

Preferably, the holding area comprises at least one inner fabric layer having a second opening through which the outflow end of the inflator is slid. The second opening positions the outflow end of the inflator at the desired position in the airbag. Moreover, the second opening effectuates an additional sealing of the outflow end against the outer wall of the airbag.

In addition, the second opening can constitute a protection against faulty assembly of the inflator. In particular, the second opening may have a smaller cross-section than the first opening and may preferably correspond to the cross-sectional dimensions of the outflow end. This helps safely prevent the inflator from being slid beyond the mounting bolt through the second opening. The edge of the second opening so-to-speak serves as a stop for the mounting bolt and marks that the inflator has reached the maximum insertion depth.

Accordingly, the first and second openings are preferably spaced apart from each other in the longitudinal direction of the inflator.

The inner fabric layer can include a guide structure for the outflow end which facilitates insertion of the inflator through the second opening and into the inner fabric layer and avoids faulty positioning.

The guide structure specifically creates a narrow guide passage whose cross-section corresponds approximately to the cross-section of the outflow end so as to increase the gas tightness.

For example, the guide structure is formed by at least one seam, specifically by a seam connecting the inner fabric layer to the outer wall of the airbag. Then said seam simultaneously also maintains the inner fabric layer in the desired position relative to the outer wall of the airbag.

In one variant, the inner fabric layer is connected to the outer wall via a seam and the second opening is disposed on the surface of the inner fabric layer.

In another variant, in the area of free lateral edges the inner fabric layer is connected to a guide passage which at one end includes the second opening and which is connected to the outer wall in the area of the first opening.

The inner fabric layer in this case preferably includes an opening which is aligned with the first opening in the outer wall of the airbag. The inner fabric layer is mounted to the outer wall preferably only in the area of said opening and, if necessary, of further openings which area aligned with the mounting openings for the mounting bolts. Then the inner fabric layer is disconnected from the outer wall in the area of the second opening, which may increase the tightness.

Preferably, in the interior of the airbag a flexible gas-conducting structure connected to the holding area is disposed into which an outflow area protrudes at the outflow end of the inflator. The flexible gas-conducting structure is provided particularly in addition to the inner fabric layer and is preferably arranged radially between the outer wall and the inner fabric layer. The outflow end of the inflator is then located between the inner fabric layer and the flexible gas-conducting structure. Since the flexible gas-conducting structure is not involved in the assembly of the inflator, it can be completely optimized for the gas-conducting function.

The flexible gas-conducting structure is, for example, a fabric layer that is shaped as a tube which is open on at least one side, mostly on both sides. The filling gas discharged by the inflator flows through the open ends into the interior of the airbag and inflates the same.

The second opening is preferably located, relating to a longitudinal direction of the inflator, inside the flexible gas-conducting structure so that the outflow area is located radially and axially completely inside the inner fabric layer and the flexible gas-conducting structure.

For connecting the airbag module to the vehicle, such as at a backrest of a vehicle seat, the holding area preferably includes at least one mounting hole through which a mounting bolt of the inflator protrudes outwardly from the airbag. By fixing the mounting bolt tightly to the vehicle, also the inflator and the airbag as well as, where necessary, a housing of the airbag module equally connected to the mounting bolt, are fixed.

For assembling the inflator inside the airbag, the inflator is inserted with the outflow end ahead through the first opening, for example, the inflator being oriented in such a way that the mounting bolt at the inflator faces away from the mounting hole. Where necessary, the inflator is rotated about its longitudinal axis by, e.g., 180° or 90° so as to guide the mounting bolt through the first opening. Where necessary, the inflator is rotated once again about its longitudinal axis, when the outflow end is slid through the second opening to align the mounting bolt relative to the mounting hole. The mounting bolt is then slid through the mounting hole until it protrudes from the airbag and can be used to mount the airbag module. If plural mounting bolts are provided, the inflator is slid through the first opening to such an extent that all mounting bolts have passed said first opening.

The airbag module can be particularly provided to be arranged in the backrest of a vehicle seat.

In a preferred application, the airbag is arranged so that it deploys as a so-called center airbag between two seats of a vehicle.

In the following, the invention shall be described in detail by way of an embodiment and with reference to the attached figures, where in the drawings.

The figures illustrate an airbag module 10 of which only an airbag 12, in each case when spread, partly when unfolded, and an elongated inflator 14, a so-called tubular inflator, are shown.

The airbag 12 is shaped and designed so that it can be arranged in and can deploy out of the backrest of a vehicle seat. In particular, the airbag 12 in this case is a center airbag which, when filled, extends between two vehicle seats and protects the vehicle occupants in both vehicle seats. Basically, the arrangement of the inflator 14 in the airbag 12 described here can be conferred upon all airbags having tubular inflators, however.

Figure 1:
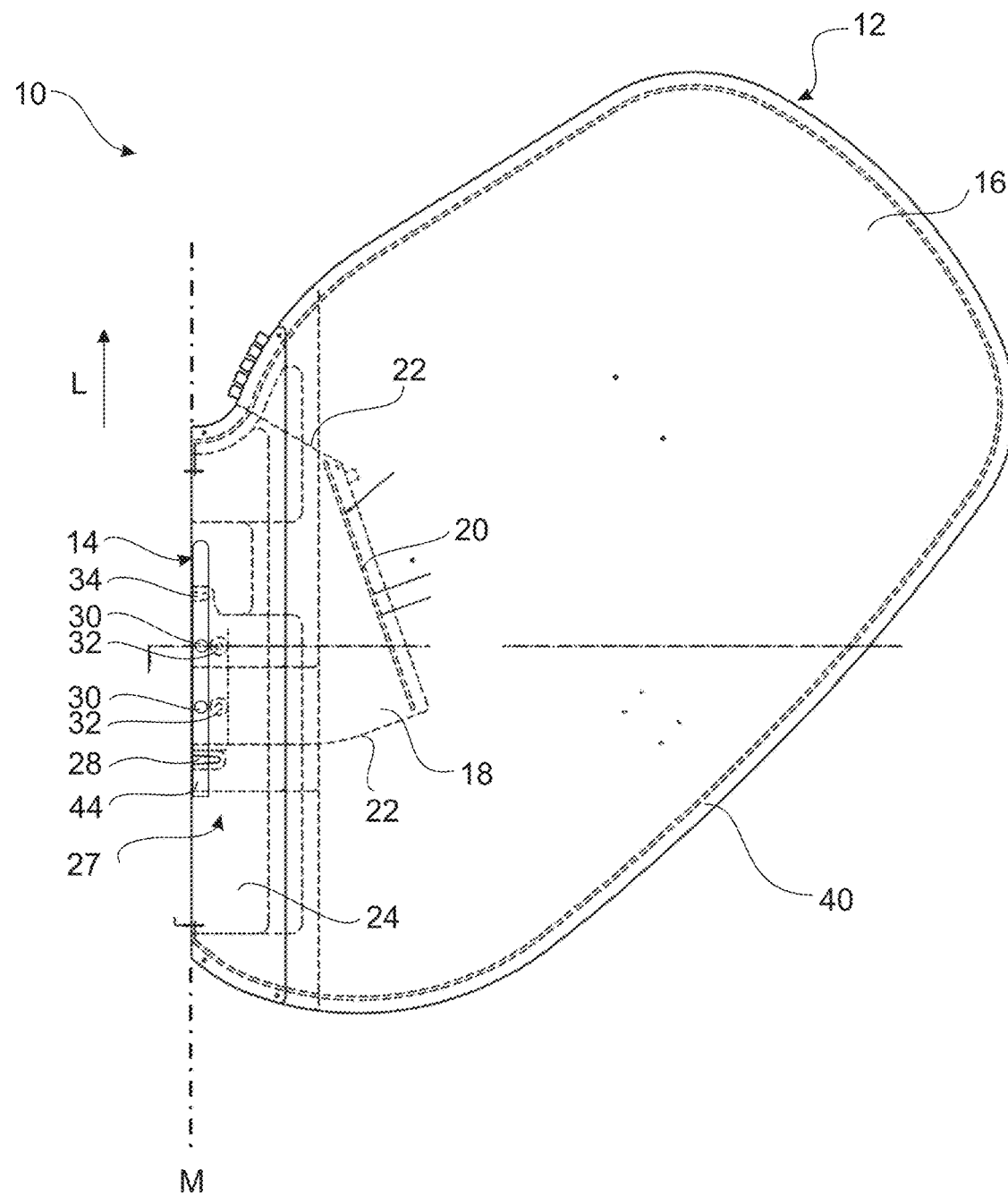
FIG. 1 shows a schematic top view onto a spread airbag of an airbag module according to the invention.

FIG. 1 illustrates the airbag 12 when flatly spread.

Figure 3:
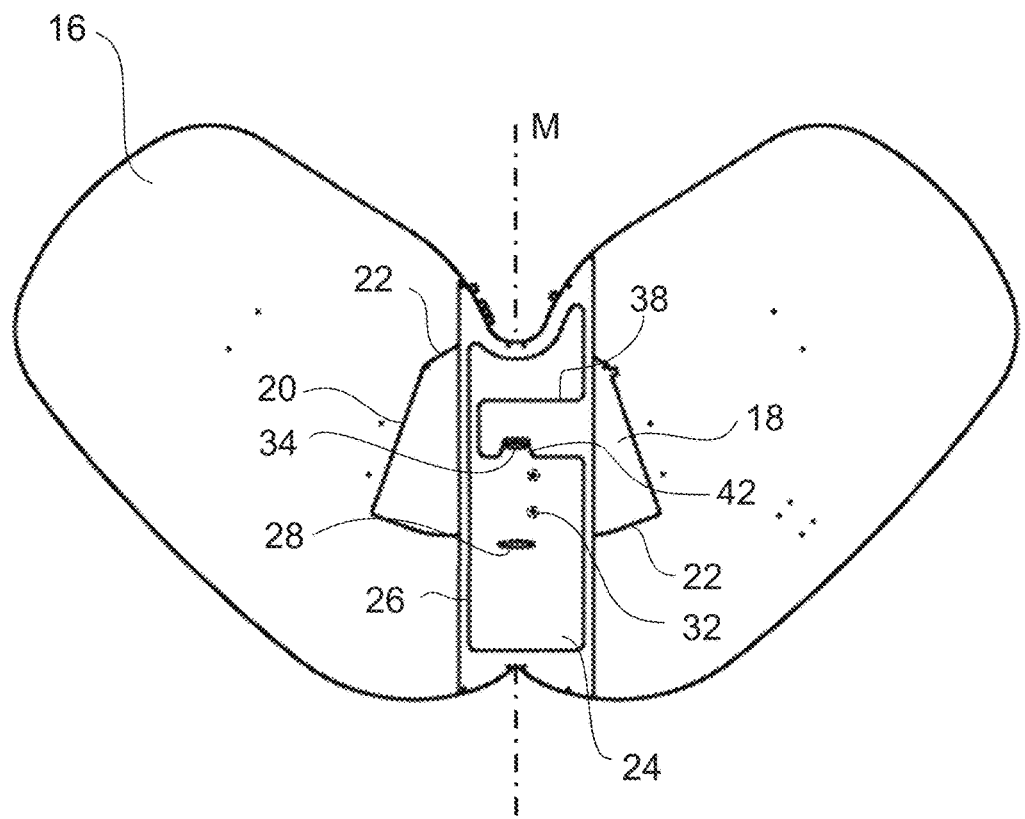
FIG. 3 shows a flatly spread cutting of the airbag from FIG. 1.
Figure 3A:
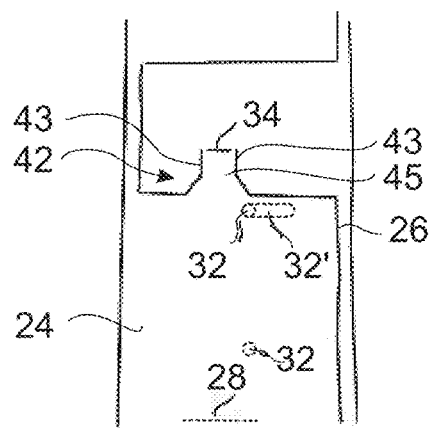
FIG. 3a shows details from FIG. 3.

FIG. 3 illustrates a cutting of the airbag 12 when unfolded and flatly spread. Here also the inner structure of the airbag 12 is clearly visible, which is shown enlarged in FIG. 3a.

An outer wall 16 of the airbag 12 is mirror-symmetrical with respect to a centerline M which, in the completed airbag 12, forms a lateral edge of the airbag 12 (see FIG. 1).

Figure 2:
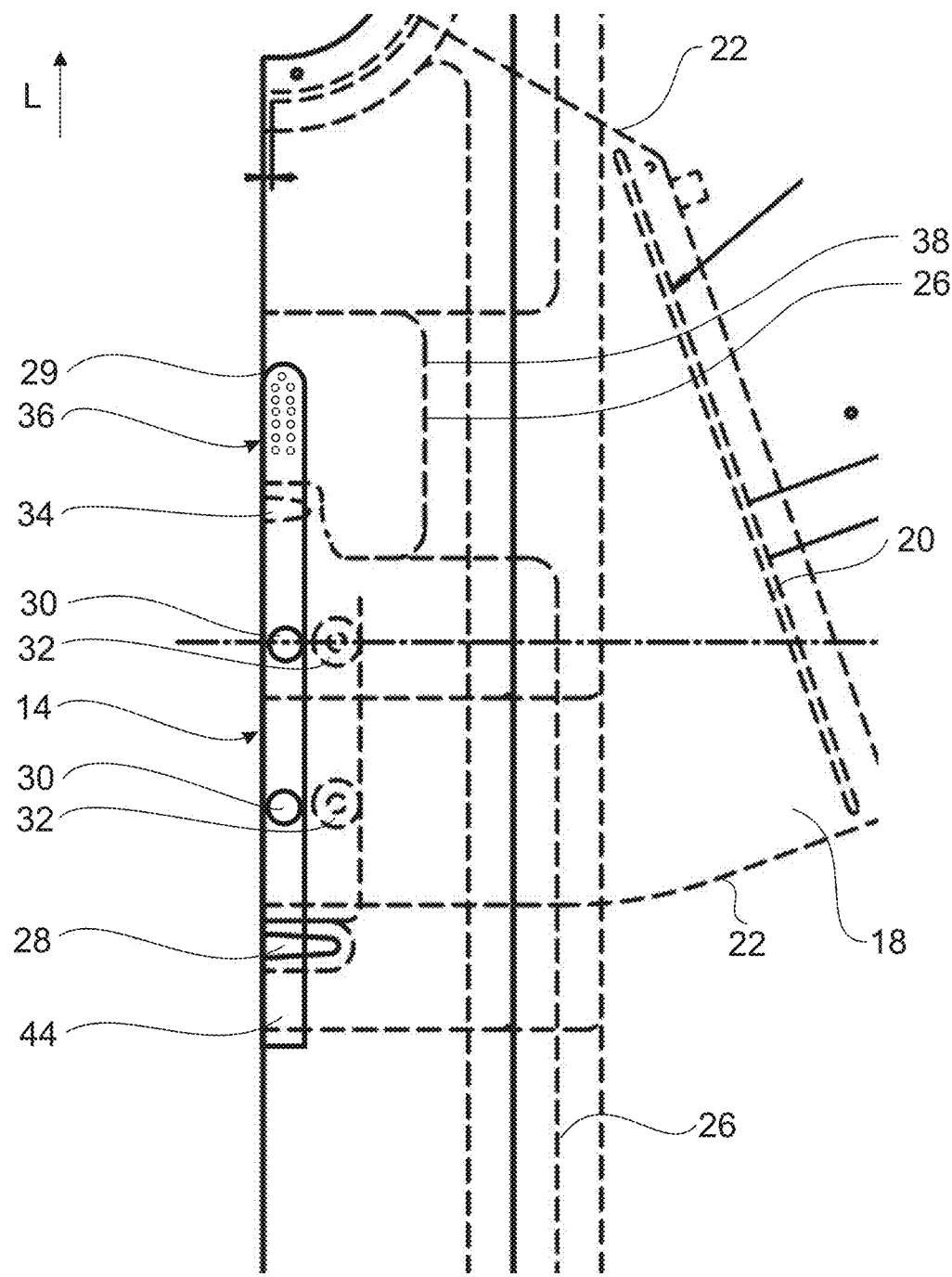
FIG. 2 shows an enlarged cutout from FIG. 1.

A flexible gas-conducting structure 18 consisting of at least one fabric layer in this case is equally aligned to be mirror-symmetrical with respect to the centerline M and is connected at its lateral edges 20 so that a tube open at both ends 22 is formed (see FIGS. 1 and 2). In the completed airbag 12, the filling gas generated by the inflator 14 can flow via the ends 22 into the interior of the airbag 12.

On the flexible gas-conducting structure 18, i.e. in the completed airbag 12 radially inside the flexible gas-conducting structure 18, there is located an inner fabric layer 24 which is connected to the outer wall 16 as well as the flexible gas-conducting structure 18 via at least one seam 26.

The area around the centerline M forms a holding area 27 for the inflator 14 (see FIG. 1).

Of course, in addition reinforcing layers not yet described here can be provided.

Figure 4:
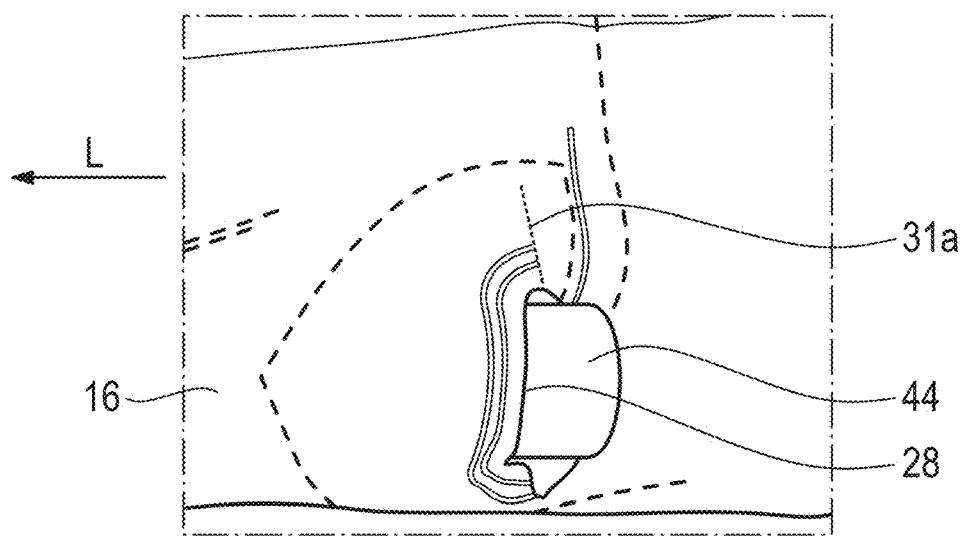
FIG. 4 shows a cutout of the airbag module according to the invention which illustrates an inflator inserted in a first opening of the airbag.
Figure 5:
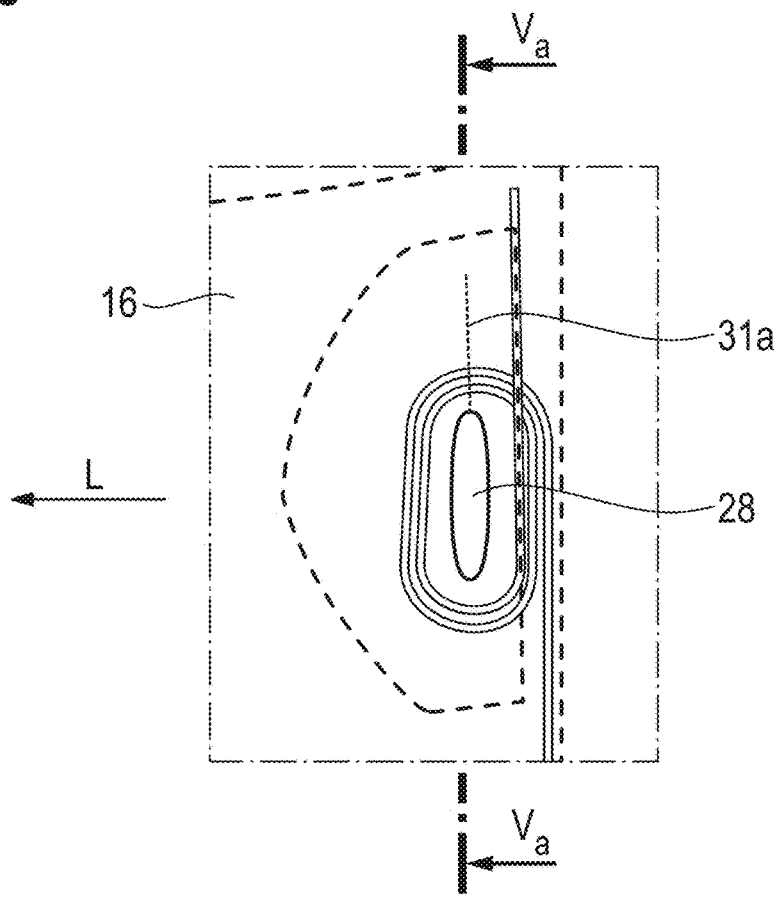
FIG. 5 shows the area of the first opening from FIG. 4.

The outer wall 16 in this case includes a slit-shaped first opening 28 which is dimensioned so that the inflator 14 can be inserted with an outflow end 29 ahead through the first opening 28 into the interior of the airbag 12 (see also FIGS. 4 and 5).

In this example, the inflator 14 includes two mounting bolts 30 projecting from the inflator 14 perpendicularly to the longitudinal direction L thereof (indicated in FIGS. 1 and 2).

The cross-section and the size of the first opening 28 are selected in a first variant so that also the mounting bolts 30 can be inserted through the first opening 28.

Figure 5A:
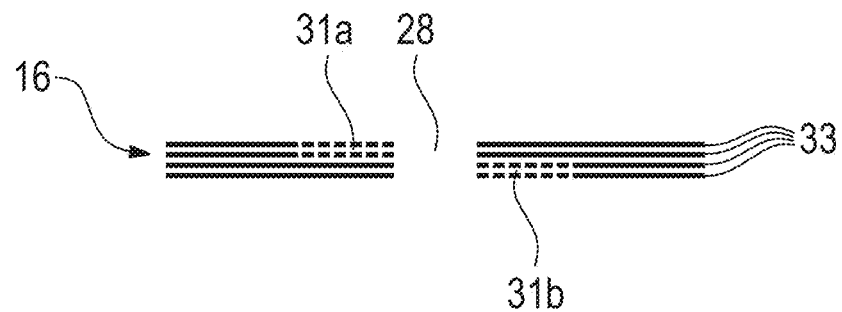
FIG. 5a shows a section along the line Va-Va from FIG. 5.

In a second variant shown in FIGS. 5 and 5a, the actual first opening 28 has a size and a cross-section which allows only the inflator 14 but not the mounting bolts 30 to be slid through. Two slits 31a, 31b which have such a radial length that also the mounting bolts 30 can pass the first opening 28 extend from the edge of the first opening 28. In this case, the slits 31a, 31b are arranged diametrically, but they can also have a suitable different orientation. In the example shown here, the outer wall 16 in the area around the first opening 28 consists of plural, in this case four, superimposed fabric layers 33. The slits 31a, 31b are arranged so that a first slit 31a (top left in FIG. 5a) severs only the two outer fabric layers 33 and the second slit 31b (bottom right in FIG. 5a) severs only the two inner fabric layers 33 which are not severed by the first slit 31a. The respective other fabric layers 33 remain closed, and none of the slits 31a, 31b penetrates all fabric layers 33.

In the circumferential direction around the first opening 28, the fabric layers 33 lie on top of each other loosely, i.e., without a seam, between the slits 31a, 31b so that a movement of the mounting bolt 30 in the circumferential direction from the first slit 31a to the second slit 31b is possible, if the mounting bolt 30 is located between the fabric layers 33.

In this way, a kind of labyrinth seal is formed through which the mounting bolt 30 of the inflator 14 has to be passed when it is inserted by rotating the inflator 12 about the longitudinal axis L thereof. After the mounting bolt 30 has passed the first slit 31*a*, the inflator 14 in this case must be rotated about 180° so that the mounting bolt 30 can be slid also through the second slit 31*b*. Since the inflator 14 is located to fit perfectly in the first opening 28 in this case, and the slits 31*a*, 31*b* do not form a continuous connection from the interior of the airbag to the environment of the airbag 12, the first opening 28 is relatively tightly sealed when the inflator 14 is inserted.

Moreover, for each mounting bolt 30 a mounting hole 32 which can be penetrated by the respective mounting bolt 30 is arranged in the outer wall 16. The flexible gas-conducting structure 18 also has mounting holes which are aligned with the mounting holes 32.

The inner fabric layer 24 includes a second opening 34 which is located, in the variant shown here, on a surface of the inner fabric layer 24 and is arranged along the longitudinal direction L of the inflator 14 spaced apart from the first opening 28. The outer wall 16 is not interrupted at this position.

The second opening 34 is positioned so that the outflow end 29 can be inserted through the second opening 34 to such an extent that an outflow area 36 of the inflator 14 through which the filling gas leaves the inflator 14 has completely passed the second opening 34.

The second opening 34 and the mounting bolts 30 are arranged in such a way, however, that in the completed airbag module 10 none of the mounting bolts 30 is slid through the second opening 34.

The first opening 28 is covered by the inner fabric layer 24. The second opening 34 creates a connection to the interior of the airbag 12 through the inner fabric layer 24.

In this case, the seam 26 is arranged so that it extends in the longitudinal direction L directly behind the second opening 34 in an arc 38.

In order to complete the airbag 12 from the state shown in FIG. 3, the two halves of the outer wall 16 are laid on top of each other and connected to each other along a peripheral seam 40 so that a fillable cushion is formed.

For assembling the inflator 14, it is initially inserted with the outflow end 29 ahead through the first opening 28.

When the outflow end 29 reaches the second opening 34, the outflow end 29 is guided by a guide structure 42 constituted here by a section of the seam 26 through the second opening 34. The guide structure 42 in this case in funnel-shaped so that the outflow end 29 is guided to the second opening 34.

The guide structure 42 comprises, e.g., two parallel seam sections 43 which are connected to the second opening 34 and delimit a narrow guide passage 45 for the outflow end 29 which has an only insignificantly larger cross-section than the outflow end 29.

Figure 6:
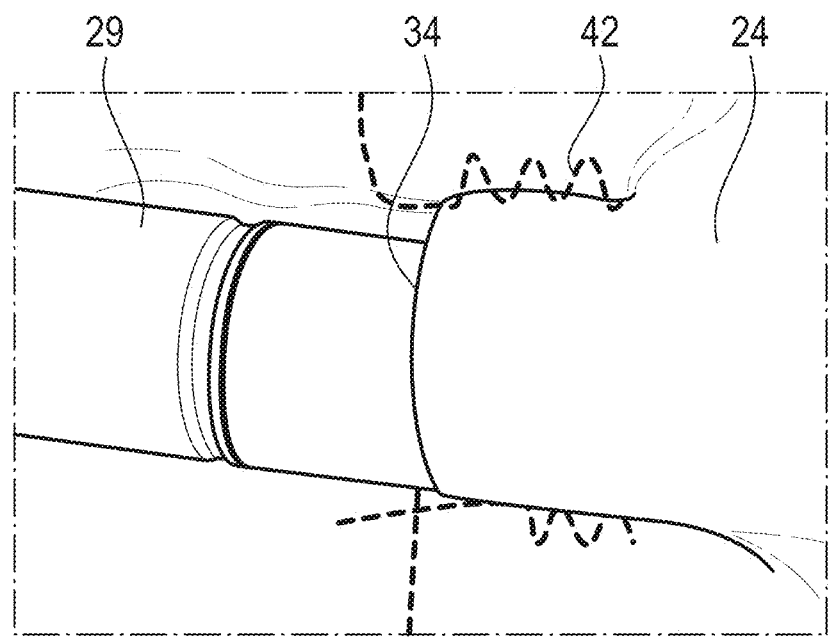
FIG. 6 shows a cutout of the airbag module according to the invention which illustrates the inflator inserted in a second opening in an inner layer.
Figure 7:
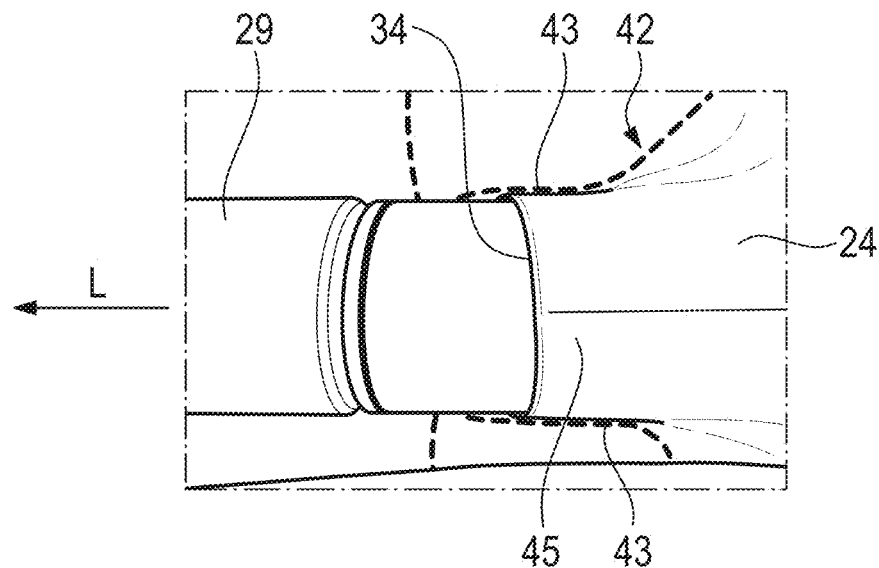
FIG. 7 shows the cutout from FIG. 6 in a variant.
Figure 8:
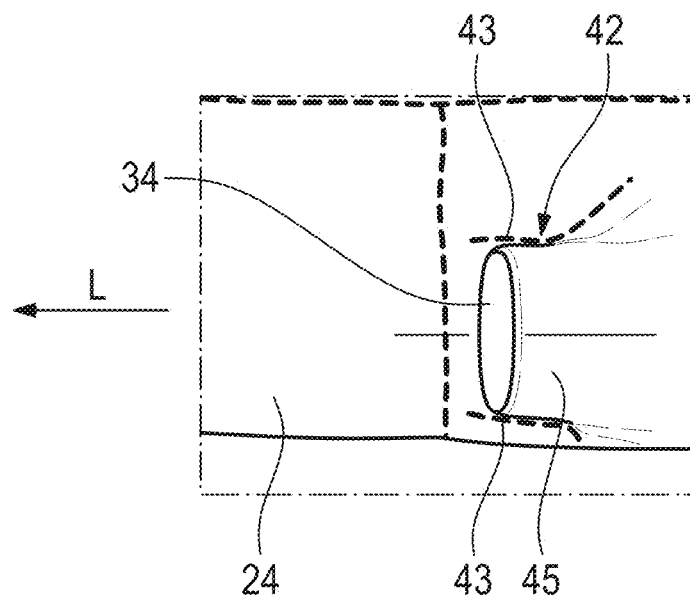
FIG. 8 shows the area of the second opening from FIG. 7.

The cross-section of the second opening 34 is only slightly larger than that of the outflow end 29 (see also FIGS. 6 and 7). This helps seal against the first opening 28, when the inflator 14 protrudes through the second opening 34, and also reduces the amount of gas which does not enter into the flexible gas-conducting structure 18.

In another embodiment, the cross-section of the second opening 34 and/or the guide passage 45 can be slightly smaller, in a state prior to assembly of the inflator 14, than that of the outflow end 29: In such embodiment, the inner fabric layer 24 is designed, at least in the area of the second opening 34 and/or the guide passage 45, to be so stretchable that it is possible to insert the outflow end 29 of the inflator 14.

FIG. 6 illustrates a variant in which the guide structure 42 has a zigzag seam. It has turned out that in this way, even when the airbag 12 is completely filled, the guide structure 42 remains substantially gastight.

An igniter section 44 at the end of the inflator 14 opposite to the outflow end 29 still protrudes through the first opening 28 from the airbag 12. This represents the final installation position of the inflator 14 in the airbag 12. The igniter section 44 comprises an igniter and includes terminals for electric lines to activate the inflator 14 (not shown).

In order to pass the mounting bolts 30 initially through the first opening 28 and subsequently through the mounting holes 32, the inflator 14 is at first oriented so that the mounting bolts 30 face the first slit 31*a*. When the front mounting bolt 30 has passed the first slit 31*a*, the inflator 14 is rotated by 180° about its longitudinal axis L so that said mounting bolt 30 can pass the second slit 31*b* as well. This procedure is repeated also for the second mounting bolt 30, if the inflator 14 includes two mounting bolts 30. When the mounting bolts 30 have passed the first opening 28, the inflator 14 is rotated again about its longitudinal axis L, e.g. by 90°, so that the mounting bolts 30 engage in the mounting holes 32 and pass through the outer wall 16.

In the example of FIG. 3, the mounting holes 32 in cross-section are exactly adjusted to the cross-section of the mounting bolts 30. In a possible variant shown in FIG. 3*a*, the mounting hole 32' situated closest to the second opening 34 is designed as a slotted hole perpendicularly to the longitudinal direction L so as to facilitate the insertion of the mounting bolt 30.

Figure 3B:
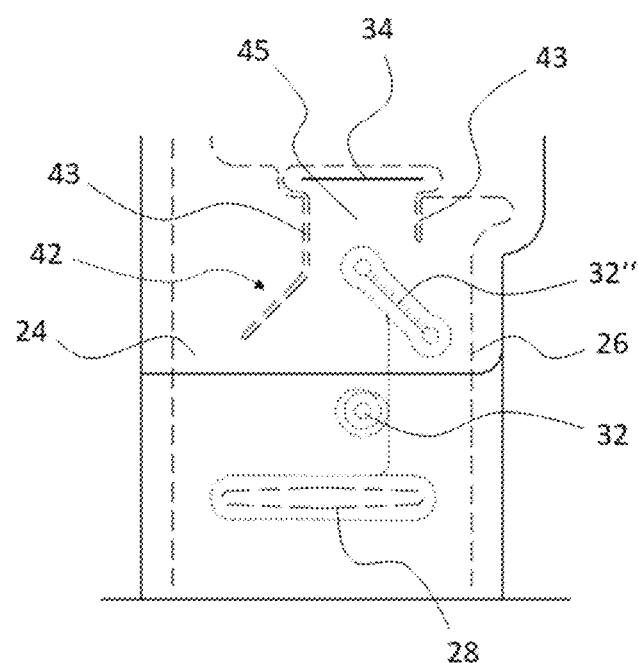
FIG. 3b shows a detail view of an alternative embodiment of a flatly spread cutting of an airbag of an airbag module according to the invention.

In addition, in FIG. 3*b* an alternative embodiment of the inner structure of the airbag 12 is shown with an alternative arrangement of the mounting hole 32". The mounting hole 32" in this embodiment is in the form of a slotted hole which is oriented at an angle with the longitudinal axis L. A longitudinal axis of the slotted hole of the mounting hole 32" can adopt any angle ranging from 0° to 180° with the longitudinal axis L in this case. Further, the mounting hole 32' can also be designed as a slotted hole of any curvature. Additionally, the airbag 12 can also be designed, as shown in the embodiment of FIG. 3*b*, without a flexible gas-conducting structure 18.

Figure 9:
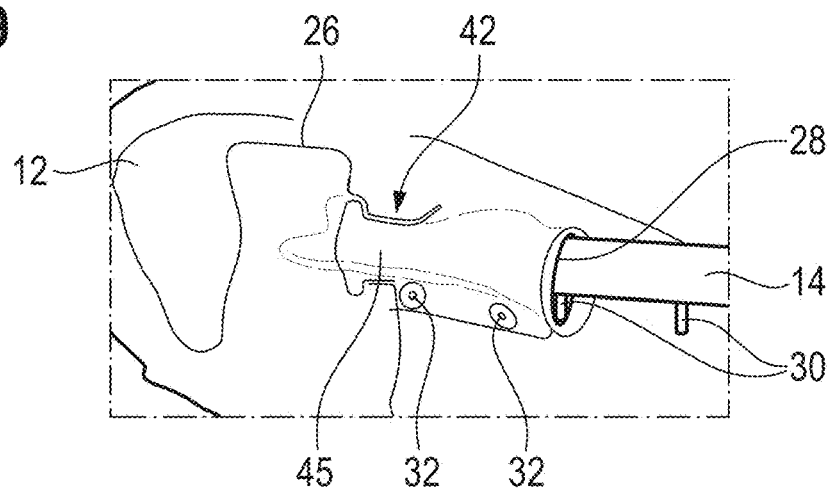
FIGS. 9 to 11 show steps for assembling an inflator in the airbag of an airbag module according to the invention.
Figure 10:
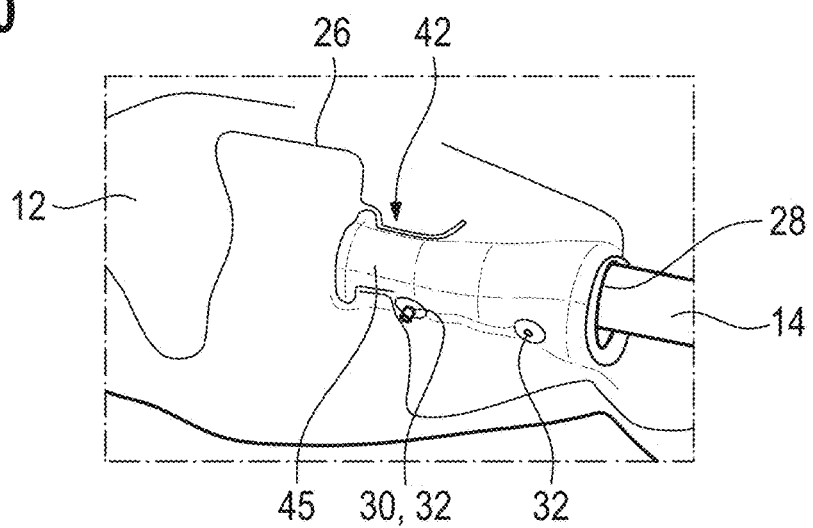
Figure 11:
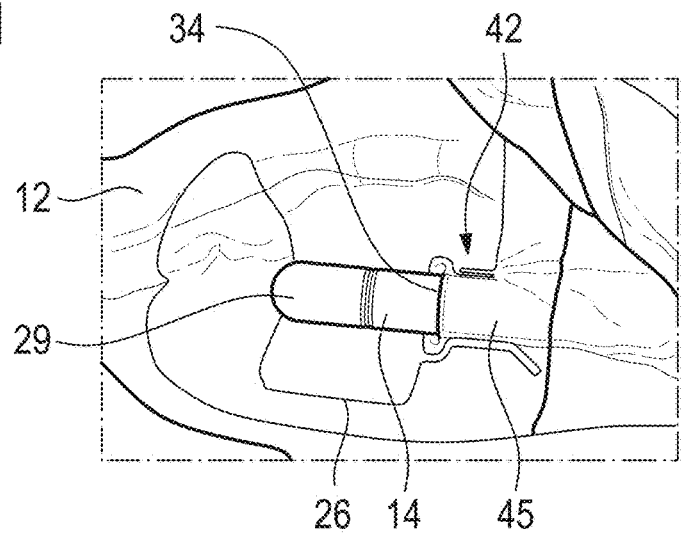

FIGS. 9 to 11 illustrate the insertion of the inflator 14 into the airbag 12 through the first opening 28 and the second opening 34 as well as the passing of the mounting bolts 30 through the mounting holes 32.

The airbag 12 is subsequently folded in a known way (not shown) and the whole airbag module 10 can be fixed to the vehicle via the mounting bolts 30.

Figure 12:
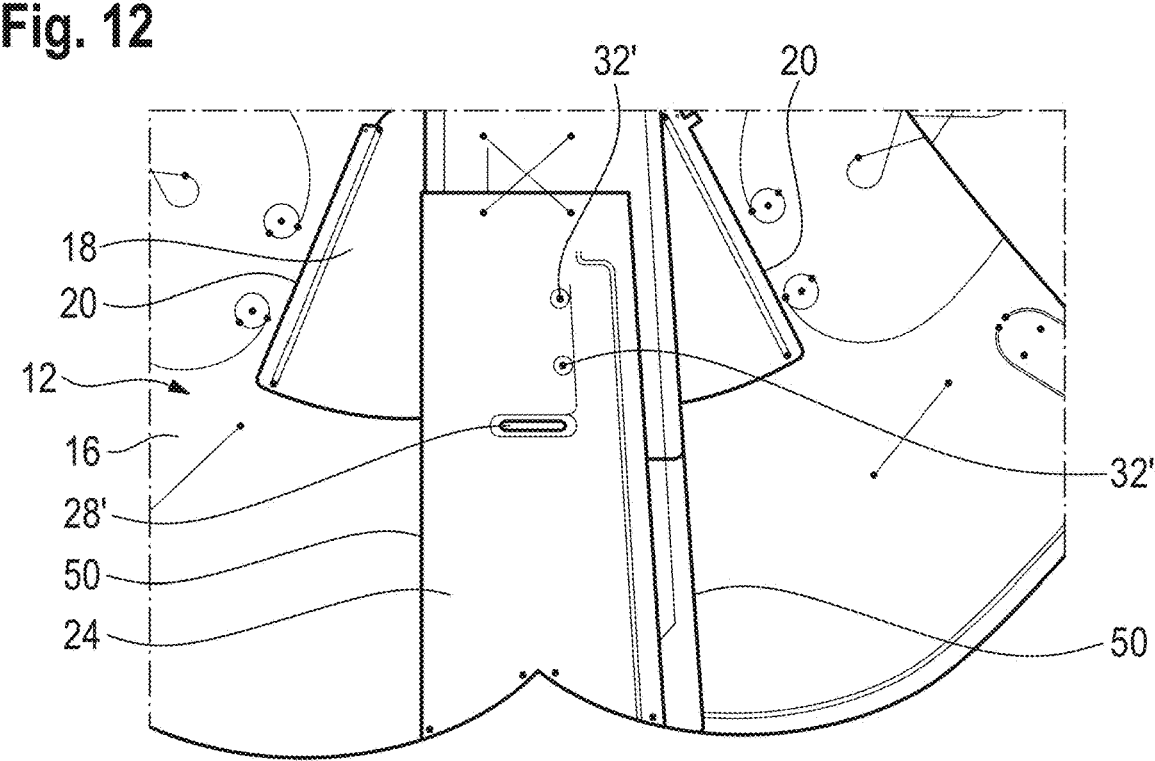
FIGS. 12 and 13 show a variant of the airbag module according to the invention.
Figure 13:
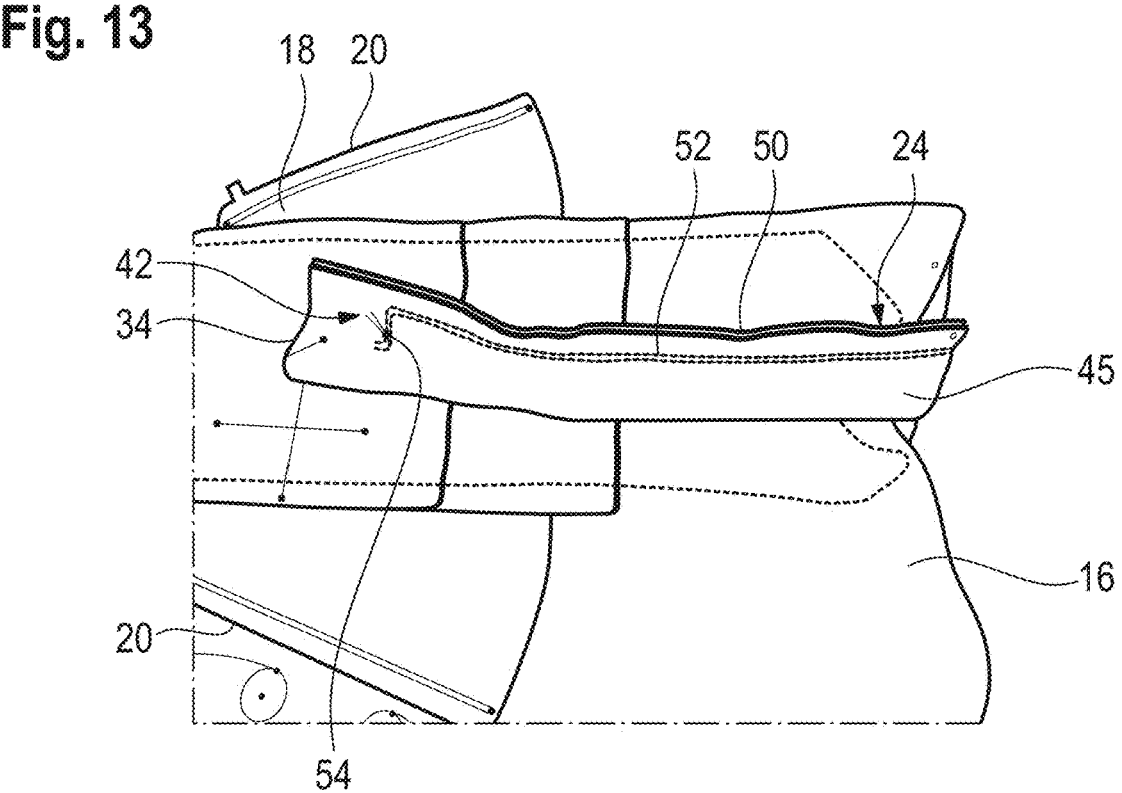

FIGS. 12 and 13 show a variant in which the inner fabric layer 24 has an opening 28' that is aligned with the first opening 28 in the outer wall 16 of the airbag 12. Moreover, two holes 32' are provided which are aligned with the mounting holes 32. The seam 26 by which the inner fabric layer 24 is fastened to the outer wall 16 in this case is provided only annularly about each of the opening 28' and the holes 32'.

Two free longitudinal edges 50 of the inner fabric layer 24 extending approximately in the longitudinal direction L are connected to each other in a seam 52 so that a hose-like guide passage 45 for the inflator 14 is formed. A section 54 of the seam 52 narrows the guide passage 54 in the area of the end remote from the first opening 28 to the cross-section of the outflow end 29 of the inflator 14 and forms the second opening 34 with the adjacent open end of the guide passage 45. The section 54 also constitutes a guide structure 42 for the outflow end 29.

For assembly in the airbag 12, the inflator 14 is slid with the outflow end 29 through the first opening 28 and, at the same time, the opening 28' is slid into the guide passage 54, until the outflow end 29 exits the guide passage 54 again through the second opening 34. Subsequently, the mounting bolts 30 are guided through the holes 32' and the mounting holes 32. Apart from the configuration of the inner fabric layer 24, all of the afore-described features can be implemented also in this variant, in particular the configuration of the first opening 28.

The invention claimed is:

1. An airbag module comprising an airbag and an elongated inflator protruding, with the exception of an igniter section, into a holding area in an interior of the airbag, wherein the inflator extends through a first opening in an outer wall of the airbag which forms the only insertion opening for the inflator, wherein the inflator includes at least one laterally projecting mounting bolt and the first opening is large enough that the inflator including the mounting bolt can be inserted through the first opening into the interior of the airbag, or the outer wall in the area of the first opening comprises plural superimposed fabric layers and, starting from the first opening, two slits are arranged, wherein a first one of the slits, starting from the outermost fabric layer of the airbag, passes through at least one, but not all fabric layers, and a second one of the slits passes through the remaining fabric layers, but not through the fabric layers severed by the first slit.

2. The airbag module according to claim 1, wherein the holding area includes at least one inner fabric layer having a second opening through which an outflow end of the inflator is slid.

3. The airbag module according to claim 2, wherein the second opening corresponds to the cross-sectional dimensions of the outflow end.

4. The airbag module according to claim 2, wherein the inner fabric layer includes a guide structure for the outflow end.

5. The airbag module according to claim 4, wherein the guide structure is formed by at least one seam, specifically by a seam which connects the inner fabric layer to the outer wall.

6. The airbag module according to claim 2, wherein the inner fabric layer is connected, in the area of free lateral edges, to a guide passage which at one end includes the second opening and in the area of the first opening is connected to the outer wall, or wherein the inner fabric layer is connected to the outer wall via a seam and the second opening is arranged on the surface of the inner fabric layer.

7. The airbag module according to claim 1, wherein a flexible gas-conducting structure connected to the holding area into which the outflow end of the inflator protrudes is arranged in the interior of the airbag.

8. The airbag module according to claim 1, wherein the holding area includes at least one mounting hole through which a mounting bolt of the inflator protrudes outwardly from the airbag.

9. A vehicle comprising an airbag module according to claim 1, wherein the airbag is arranged in such a way that it deploys between two seats of a vehicle.

10. An airbag module comprising an airbag and an elongated inflator protruding, with the exception of an igniter section, into a holding area in an interior of the airbag, wherein the inflator extends through a first opening in an outer wall of the airbag which forms the only insertion opening for the inflator, wherein the holding area includes at least one inner fabric layer having a second opening through which an outflow end of the inflator is slid, and wherein the inner fabric layer includes a guide structure for the outflow end.

11. The airbag module according to claim 10, wherein the guide structure is formed by at least one seam, specifically by a seam which connects the inner fabric layer to the outer wall.

12. An airbag module comprising an airbag and an elongated inflator protruding, with the exception of an igniter section, into a holding area in an interior of the airbag, wherein the inflator extends through a first opening in an outer wall of the airbag which forms the only insertion opening for the inflator, wherein the holding area includes at least one inner fabric layer having a second opening through which an outflow end of the inflator is slid, and wherein the inner fabric layer is connected, in the area of free lateral edges, to a guide passage which at one end includes the second opening and in the area of the first opening is connected to the outer wall, or wherein the inner fabric layer is connected to the outer wall via a seam and the second opening is arranged on the surface of the inner fabric layer.

* * * * *